United States Patent Office 3,038,309
Patented June 12, 1962

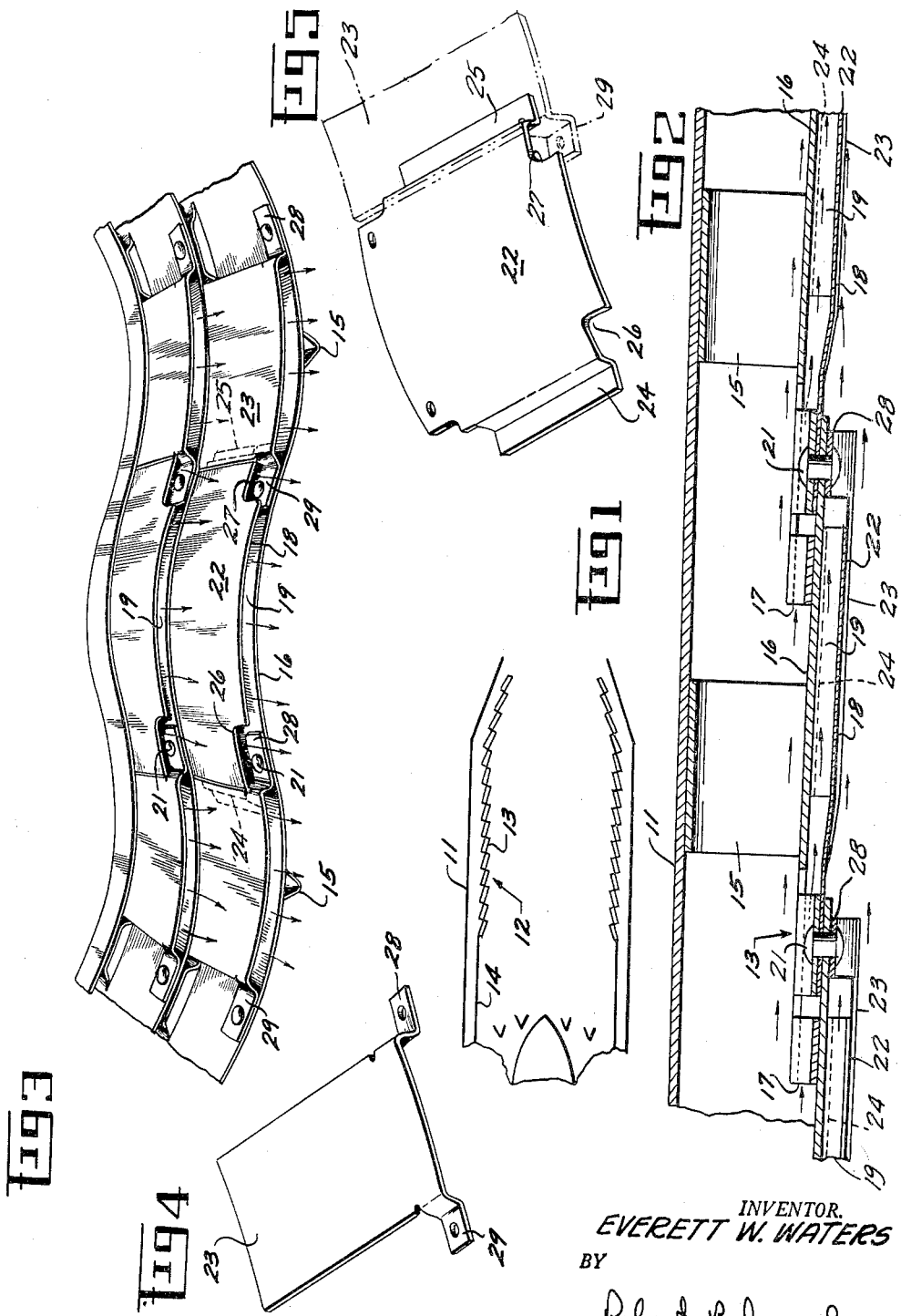

3,038,309
COOLING LINER FOR JET ENGINE
AFTERBURNER
Everett W. Waters, Cincinnati, Ohio, assignor to General
Electric Company, a corporation of New York
Filed July 21, 1959, Ser. No. 828,478
2 Claims. (Cl. 60—39.66)

The present invention relates to a cooling liner for an afterburner section of a jet engine and more particularly to a shielded cooling liner for use in advanced, high temperature afterburners.

A cooling liner is frequently used in the afterburner section of a jet engine to reduce the temperature of the structural shell of the afterburner to a safe level. A cooling liner takes the form of a generally cylindrical member positioned in the afterburner in concentric, closely spaced relation with the structural shell. The liner limits the temperature of the structural shell by intercepting the radiation from the combustion gas and by preventing the combustion gas from coming into direct contact with the shell. Up to the present time, cooling liners have been of two general types: convection cooled and film cooled. In each case, some turbine discharge gas flows as a coolant between the structural shell and the cooling liner. In the first case, the flow of cooling gas over the adjacent surfaces of the liner and the shell is the only cooling effect employed. In the latter case, openings such as louvers or continuous slots are provided at spaced intervals over the length of the liner. The film cooled liners make use of the pressure drop across the liner to inject part of the coolant flow through the louvers or slots in the liner. A more or less continuous film of coolant is thereby established along the inner surface of the liner between the liner and the combustion gas. Up to the present time the materials available for use in cooling liners have been capable of withstanding the pressure drop across the liner at the temperatures encountered in conventional afterburners. However, in advanced afterburners, temperatures at some operating conditions have increased to the point that conventional liners of known materials are unable to resist the combined temperatures and pressures which are generated. The result has been that the performance capabilities of advanced afterburners have been severely limited by the available cooling liner constructions.

An object of the present invention is to provide a shielded cooling liner for jet engine afterburners which permits a major reduction in overall liner weight and allows a significant increase in afterburner performance levels.

To achieve the above object a shielded cooling liner is provided which includes a convection-cooled, stress-bearing liner and a thin, lightweight, film-cooled radiation shield which carries no stress and is positioned in concentric relation within the stress bearing liner. The radiation shield extends over the full axial length of the liner and is spaced slightly therefrom. Both the liner and the shield are provided with circumferential slots through which coolant is injected to cool both surfaces of the liner and the shield. The radiation shield intercepts radiation from the combustion gases. The liner is surrounded by coolant and a stream of coolant flows between the liner and the outer shell. As a result, the temperature of the outer shell is practically independent of combustion gas temperature level. With the radiation shield installed the outer shell and the stress bearing liner operate at a temperature closely approximating that of the coolant fluid.

Other objects and many of the intended advantages of this invention will be readily appreciated as the same becomes understood by reference to the following detailed description when considered in connection with the accompanying drawings wherein:

FIG. 1 is a schematic view of the present invention installed in a jet engine tailpipe;

FIG. 2 is an elevation view of a portion of the shielded cooling liner of FIG. 1 in section and at an enlarged scale;

FIG. 3 is a perspective view of a portion of a shielded cooling liner according to the present invention; and FIGS. 4 and 5 are perspective views of segments of the shield of FIG. 3.

Referring to FIG. 1 of the drawing, a jet engine tailpipe is illustrated at 11. A shielded cooling liner according to the present invention is shown at 12 mounted within the tailpipe. The cooling liner includes a shielded portion 13 which surrounds the actual combustion space, and an unshielded portion 14 which extends upstream of the combustion space to pick up coolant fluid.

Referring to FIG. 2 of the drawing, the liner is illustrated as suspended within the tailpipe by means of hanger brackets 15. The liner is of continuous slot construction and includes a number of generally cylindrical strips 16 arranged in an axial series with the trailing edge of each strip overlapped by the leading edge of the next adjacent downstream strip. The overlapping edges of adjacent strips are secured together at spaced points about the circumference of the liner. Between such points, the edges are spaced apart to form coolant slots 17. A thin, light-weight, radiation shield 18 is secured to each of the strips 16 adjacent its leading and trailing edges and extends over the full exposed length of the strip. Each radiation shield is spaced from its associated strip throughout its axial length to define a passage 19 therebetween for coolant flow. As shown in FIG. 2 the overlapping edges of adjacent strips and the overlapping edges of their associated shields may be secured together by a single rivet 21. Aerodynamic loading on the radiation shields is, for all practical purposes, avoided by keeping each shield essentially parallel to the streams of coolant fluid and combustion gas. The pressure drop across the shield is reduced to practically zero, therefore the shield acts as a separator, not a pressure container.

As shown in FIG. 3 of the drawing, the liner strips 16 are continuous, whereas the shields 18 are made up of a plurality of arcuate segments which are individually attached to the liner strips. The shield segments are of two general types 22 and 23 which are assembled in alternating fashion to make up the shield. Segment 22 is generally square and has a pair of oppositely directed projections 24 and 25, each of which protrudes from a lateral edge at the approximate mid-length thereof. The free extremities of the projections 24 and 25 are displaced from, and generally parallel with, the plane of the segment. Segment 22 is also provided with cut-outs 26 and 27 at its downstream corners. The leading edge of each segment 22 bears against the outer surface of a liner strip 16 adjacent its trailing edge while the projections 24 and 25 abut the inner surface of the next adjacent downstream strip. Segment 23 is generally rectangular in form with two ears 28 and 29 extending laterally in opposite directions adjacent its trailing edge. The ears 28 and 29 are displaced from the plane of the body of the segment and are adapted to be secured to a liner strip. In making up a shield, segments 23 are assembled between adjacent segments 22 such that their lateral edges overlap those of the segments 22. Ears 28 and 29 are then secured to the trailing edge of the liner strip within cutouts 26 and 27. As assembled, the leading edges of segments 22 and 23 bear against the outer surface of the same liner strip and projections 24, 25 and ears 28, 29 abut the inner surface of the next adjacent downstream strip. With this arrangement a minimum number of rivets can be used to secure together the liner strips and shield segments. To illustrate, each rivet passes through an ear of a segment 23, the overlapped edge of one liner strip, the leading edge of a segment 22, and the overlapping edge of the next adjacent downstream liner strip. In this construction each shield segment is secured to a liner strip adjacent one edge and can be easily replaced without disturbing adjacent segments by merely removing two adjacent rivets. Thermal stresses in the shield are eliminated by the use of the small segments. Since the segments are small, heat is readily conducted throughout the segment and is not concentrated in one portion as it would be if the shield were in one piece.

In operation, coolant flows in an axial direction within the space between the liner and the tailpipe shell. A portion of the coolant flows into the openings 17 and hence into the spaces 19 between the radiation shields and the liner strips. This coolant is then discharged through the trailing edge slot between the shield and strip and flows downstream to form a cooling film over the inner surface of the next adjacent downstream shield. Heat radiated from the combustion gases is absorbed by the radiation shield and does not come in contact with either the liner strips or structural shell. Heat absorbed by the radiation shield is dissipated by the flow of coolant through spaces 19 and only a small amount is absorbed by the liner strips. Since the outer surface of the liner is convective cooled by the coolant flowing between the liner and shell, little, if any, of the heat absorbed by the liner is transmitted to the structural shell. Accordingly, the shell is subjected to only the heat of the coolant fluid.

The material of the radiation shielding employed in the present invention can run successfully up to approximately 2100° F. without any difficulty, providing the segments are held in position in such a way as to eliminate essentially all thermal and aerodynamic loading stresses. Because the shields are not structural they can be made of very lightweight sheetstock, for instance, 0.010″ or less in thickness. With this construction the liner is exposed to the relatively cool temperatures of the shields rather than the considerably higher combustion gas temperatures. This construction permits an appreciable increase in the afterburner combustion temperatures as well as in the turbine discharge temperatures while materially decreasing the operating temperature of the liner itself. In actual tests and engine operation the structural strips of the liner have run at from 20 to 30° F. higher than the turbine discharge temperature. Under these conditions, more heat is lost through the structural shell than is received by the liner. Since the liner and the structural shell operate at decreased temperatures they can be constructed of lighter weight and lower cost material. Thus permitting a saving in weight and expense of the afterburner structure.

While the shielded liner of the present invention is illustrated in connection with an afterburner, it is understood that it is applicable to any area of high intensity combustion, such as in an annular combustor of a jet engine.

While a particular embodiment of the invention has been illustrated and described, it will be obvious to those skilled in the art that various changes and modifications may be made without departing from the invention and it is intended to cover in the appended claims all such changes and modifications that come within the true spirit and scope of the invention.

What I claim is:

1. In combination with a combustion chamber defined by a stress-bearing generally cylindrical wall member containing the combustion gas stream, a radiation shield assembly positioned concentrically within and in radially spaced relation with said wall member, said radiation shield assembly comprising an axial series of generally cylindrical shield members each composed of a plurality of arcuate segments having side edges generally parallel to said gas stream, alternate segments being secured to said wall member adjacent their upstream ends and including projections adjacent their side edges engaging said wall member to hold said segments spaced therefrom, the remaining segments being secured to said wall member adjacent their downstream ends and having their side edges overlapping the side edges of said alternate segments to limit movement of the downstream portions thereof away from said wall member and to limit movement of the upstream portions of said remaining segments toward said wall member.

2. A shielded cooling liner comprising a stress-bearing liner defining a combustion chamber the outer surface of which is exposed to a stream of coolant, said liner including a plurality of generally cylindrical strips arranged in axial series with the trailing edge of each strip disposed in spaced overlapped relationship with the leading edge of the next adjacent downstream strip for coolant flow inwardly through the liner, a plurality of radiation shields each positioned concentrically within one of said strips and each radially spaced from its thus related strip, each said shield including a plurality of arcuate segments having side edges generally parallel to the direction of coolant and combustion flow, alternate segments being secured adjacent their upstream ends to the one of said strips next upstream of their related strip and including projections adjacent their side edges engaging said related strip to hold said segments spaced therefrom, the remaining segments being secured to said related strip adjacent their downstream ends and having their side edges overlapping the side edges of said alternate segments to limit movement of the downstream portions thereof away from said related strip and to limit movement of the upstream portions of said remaining segments toward said related strip, said remaining segments underlapping the one of said strips next upstream of their related strip to limit movement of their upstream portions away from said related strip.

References Cited in the file of this patent

UNITED STATES PATENTS

| | | |
|---|---|---|
| 2,544,538 | Mahnken et al. | Mar. 6, 1951 |
| 2,617,255 | Niehus | Nov. 11, 1952 |
| 2,874,536 | Benson et al. | Feb. 24, 1959 |
| 2,918,793 | Jerie et al. | Dec. 29, 1959 |
| 2,927,424 | Hyde | Mar. 8, 1960 |